J. D. BOWNE.
DETACHABLE TIRE FASTENER.
APPLICATION FILED FEB. 1, 1913.
1,088,200.
Patented Feb. 24, 1914.
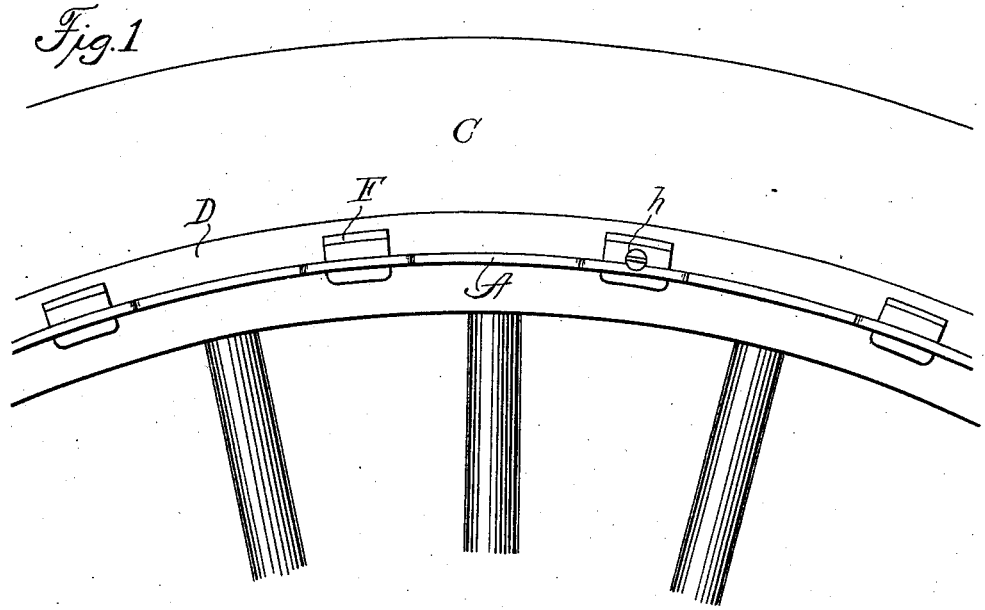
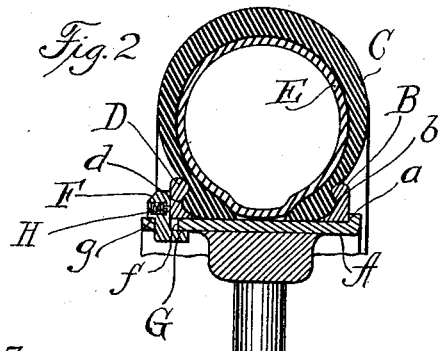
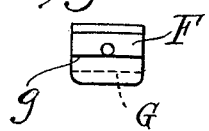
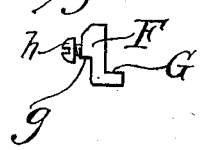
Witnesses
G. A. Sutphen
G. Terry
Inventor
John D. Bowne,
By Edwin Guthrie
Attorney

UNITED STATES PATENT OFFICE.

JOHN D. BOWNE, OF JAMESBURG, NEW JERSEY, ASSIGNOR OF ONE-HALF TO WILLIAM B. HARDING, OF WESTFIELD, NEW JERSEY.

DETACHABLE TIRE-FASTENER.

1,088,200.  Specification of Letters Patent.  Patented Feb. 24, 1914.

Application filed February 1, 1913. Serial No. 745,626.

*To all whom it may concern:*

Be it known that I, JOHN D. BOWNE, citizen of the United States, residing at Jamesburg, in the county of Middlesex and State of New Jersey, have invented certain new and useful Improvements in Detachable Tire-Fasteners, of which the following is a specification.

This invention relates to detachable tire fasteners, and belongs to that class of devices designed with the view of enabling the tires, usually the inflated tires, of automobile vehicles to be removed and replaced quickly and conveniently without the aid of special tools or appliances.

This invention consists of parts having particular construction and arrangement for the purpose stated, substantially as illustrated in the accompanying drawings of which—

Figure 1 represents a portion of a wheel such as is used for motor vehicles, and having an inflated tire secured with fastenings made and disposed in accordance with this invention. Fig. 2 is a cross section on the broken line x—x of Fig. 1. Figs. 3 and 4 are respectively front and side views of one of the keys detached.

Throughout the drawings and description the same letter is employed to refer to the same part.

Considering the drawings, it will be observed that the rim A of the wheel has a cylindrical outer surface provided at one edge with a raised annular shoulder a. Upon the rim A and arranged against the shoulder a is the inner movable ring B, having the groove b constructed to receive the side of the shoe C, as illustrated in Fig. 2. Upon the rim A is also the second and outer removable ring D, having the groove d constructed to receive the side of the shoe as shown. The two rings are alike.

When the shoe C is expanded by the inflated inner tube E, the ring D is pushed upon toward the edge of the rim A. The ring D, and, consequently, the shoe C are secured upon the rim by means of the keys F passed through spaced slots f in the rim substantially as illustrated. The keys are arranged against the flat or outer side of the ring D, and each key is provided with two shoulders as shown in Figs. 1 and 4. The shoulder G of the key engages the inner surface of the rim adjacent to the slot f, and the shoulder g is arranged to engage the outer surface of the rim and the edge of the slot as shown in Fig. 2, when the tire or shoe is expanded against the ring D. It will be noted that the portion of the key provided with the shoulder g is thickest, but not too thick to pass readily outwardly through the slot, while the shoulder G and key taken together are wider than the slot. The shoulder G extends across the slot and rests against the surface near the edge of the slot on the inside of the rim A. When the inner tube is no longer inflated and does not press against the shoe, the keys may be easily removed from the slots by hand, or by a slight tap with a hammer or other tool, and the ring D and shoe removed without difficulty.

In practice, it is customary to provide each key with a spring pin H as shown in Fig. 2, or a small screw h, as shown in Fig. 4, to prevent the keys from dropping out when the inner tube is no longer inflated. To remove or replace a key F provided with a spring pin H or screw h, the spring pin is pressed inwardly or the screw taken out, in order that the upper portion of the key F may be passed through the slot. Any convenient means may be employed for this purpose.

The operation of this invention consists in first removing the keys and ring D, then placing the shoe with its inner tube upon the rim, then placing the ring D and keys again in place. Upon inflating the inner tube the ring D is strongly pressed against the keys, and the shoe secured on the rim A.

Having now described this invention, and explained the mode of its operation, what I claim is:—

The combination with a wheel having a flat rim provided with spaced slots, of a ring encircling the rim removably at the side, and keys constructed and arranged to retain the said ring upon the rim, each key having a portion fashioned to pass through a slot, the said portion of the key having a shoulder constructed to engage the outer surface of the rim at the outer edge of the slot, the said portion of the key having also above said shoulder a movable device constructed to retain the key in the slot when the tire is deflated, and each key having a second and relatively wider shoulder located next the inner surface of the rim.

In testimony whereof I affix my signature in presence of two witnesses.

JOHN D. BOWNE.

Witnesses:
FRED W. GUNSON, Jr.,
M. I. FISCHER.

Copies of this patent may be obtained for five cents each, by addressing the "Commissioner of Patents, Washington, D. C."